July 3, 1962     A. H. SMITH     3,042,461

DOLLY FOR CLEANING APPARATUS WITH IMPROVED WHEEL BEARINGS

Filed Nov. 20, 1958

INVENTOR.
AARON H. SMITH

BY

ATT'YS.

United States Patent Office 3,042,461
Patented July 3, 1962

3,042,461
DOLLY FOR CLEANING APPARATUS WITH IMPROVED WHEEL BEARINGS
Aaron H. Smith, Lynn, Mass., assignor to Signal Manufacturing Co., Lynn, Mass., a corporation of Massachusetts
Filed Nov. 20, 1958, Ser. No. 775,257
3 Claims. (Cl. 308—15)

This invention relates to dollies for use with apparatus for treating floors.

In United States Patent No. 2,972,155, issued to Aaron H. Smith, dated February 21, 1961, there is shown a twin brush machine for treating floors, which is designed to be supported by means of a dolly for movement relative to the surface to be operated upon. The dolly shown therein has three wheels, one at the front and a pair of laterally spaced wheels at the back to facilitate movement of the apparatus. Downwardly open wheel wells are provided to enclose the wheels to minimize fouling, nevertheless in the course of time, cleaning compounds and rug lint accumulate to such an extent that it is necessary to remove the wheels to clean out the wells and wheels themselves. The principal objects of this invention are to provide improved bearings for the wheel wells for supporting the axles of the wheels so that they may be engaged and disengaged from the bearings without difficulty, thereby to encourage cleaning of the wells and wheels at frequent intervals; to provide bearings which are especially designed to facilitate manually removing and inserting the wheels and their axles into the small, comparatively inaccessible wheel wells of the dolly which are difficult to reach without the aid of tools; to provide bearings which are durable; and to provide bearings which are adapted to be formed as part of the molding making up the dolly.

As herein illustrated, the dolly frame has a plurality of wheel wells open at the bottom for housing wheels with their lower portions extending downwardly therefrom, each well having spaced walls between which the wheel shaft is journaled. The bearings for the ends of the shaft are constituted by bosses on each wall, each bearing having an upper part rigid with the wall and a lower unattached part extending downwardly from the rigid part which is yieldable to and from the plane of the wall. The lower unattached part contains a bearing opening for receiving an end of the wheel shaft and an opening narrower than the diameter of the shaft, affording access to the bearing opening. The unattached portions, at opposite sides of the narrow opening, are free to yield relative to each other in a plane perpendicular to the axis of the shaft.

The invention will now be described in greater detail with reference to the accompanying drawings wherein.

Figure 1:
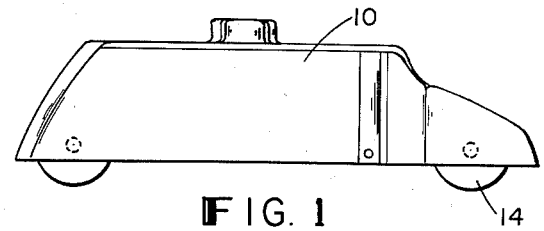
FIG. 1 is a side elevation of a dolly.
Figures 2, 3:
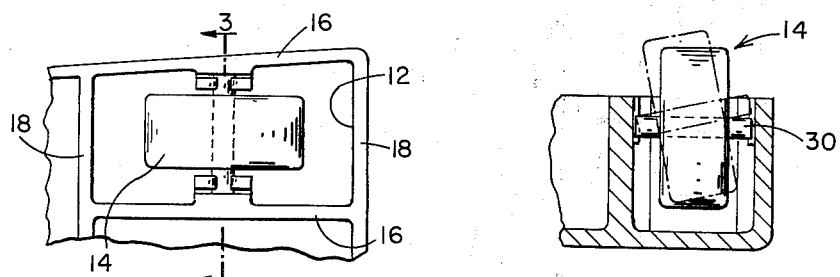
FIG. 2 is a bottom view of a fragmentary portion of the dolly at one of the wheel wells, showing the wheel journaled therein.
FIG. 3 is a vertical section taken on the line 3—3 of FIG. 2.
Figure 4:
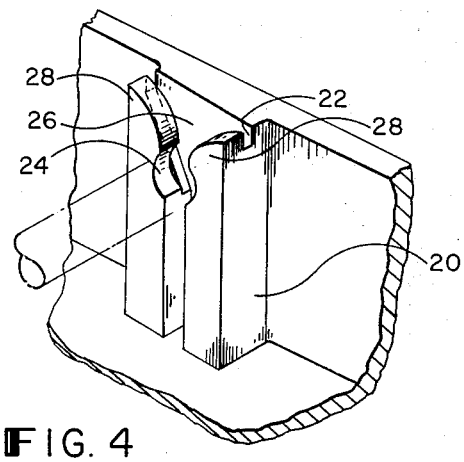
FIG. 4 is an enlarged fragmentary view in perspective of one of the shaft bearings as seen from the bottom.

Referring to FIG. 1, the dolly 10, as herein illustrated, is a molded plastic shell having at its forward and rear ends wheel wells 12 (FIG. 2), in which are journaled wheels 14. To minimize accumulation of cleaning compound and lint in and about the wheels, the wheel wells 12 are designed to confine all but the lower portion of the wheels and are comparatively small in cross-section. Thus the well 12, shown in FIG. 2, has narrowly spaced walls 16 defining two sides of the well and walls 18 defining the opposite ends of the well, which provide little more room than is necessary to accommodate the wheel so that only the lower extending portion of the wheel is accessible from outside the well. Because of the limited space it is difficult to insert and remove the wheels manually and even to employ tools for this purpose. Hence, it is desirable to provide bearings within the wheel wells which will permit the wheels to be inserted and removed easily enough so that tools are not required and so as to encourage frequent cleaning. To this end there is formed on the inner side of each wall 16 (FIGS. 3 and 4) a boss 20, which extends from the bottom of the well to the lower edge of the wall 16. That part of the boss near the bottom of the well is rigidly joined to the wall 16, being formed integral therewith during the molding process, and that part near the lower edge of the wall 16 is separated from the wall by a slot 22 which extends from the lower edge of the wall upwardly between the wall and the boss, so as to divide the lower part of the boss from the wall. This lower part of the boss, being unattached from the wall, is accordingly yieldable to and from the plane of the wall and in this part there is a bearing opening 24 for receiving an end of the wheel shaft. Access to the bearing opening 24 is afforded by an opening 26 which extends from the opening 24 downwardly toward the lower end of the boss. The opening 26, adjacent the opening 24, is narrower than the diameter of the shaft and diverges laterally and downwardly therefrom. The unsupported parts of the boss at opposite sides of the narrow opening provide spaced fingers 28—28 which will yield to and from each other in a plane perpendicular to the axis of the shaft to permit the shaft to be forced between them into the bearing opening 24. To insure stiffness and strength without impairing the flexibility of the fingers, both to and from the wall, and to and from each other, the slot 22 is comparatively short from bottom to top at the outer edges of the boss and has upwardly converging walls which terminate at substantially the top level of the bearing opening 24.

As thus constructed, a wheel 14 with its shaft 30 (FIG. 3) may be mounted in a pair of bearings by dropping the wheel and shaft into a well 12 so that the ends of the shaft 30 rest on the flared surfaces between the fingers 28, and then applying, by means of the fingers, pressure directly downward so as to force the ends of the shaft through the narrow openings 26 between the laterally yieldable fingers 28 into the bearing openings 24. The wheel may as easily be removed by applying pressure with the fingers to one side of the downwardly projecting portion of the wheel in the direction of the arrow (FIG. 3) so as to tilt the wheel laterally, thereby to lift the end of the shaft at that side upwardly and out of its bearing. In the absence of flexibility in the fingers 28, to and from the wall, tilting of the wheel would be resisted so strongly that it would be quite impossible to remove the wheel in this fashion even though there was some flexibility of the fingers to and from the wall, as well as to and from each other, the shaft 30 can be disengaged from the bearing to free it and then the entire wheel removed solely by finger pressure.

The bearing, as thus described, in addition to providing for ease of inserting and removing the wheels is also practical form the standpoint of ease in manufacture by molding.

It should be understood that the present disclosure is for the purpose of illustration only and that this invention includes all modifications and equivalents which fall within the scope of the appended claims.

I claim:

1. In a dolly, wheel wells open at the bottom for housing wheels provided with shafts therein, said wells enclosing the wheels so that only the lower portions thereof extend and are accessible from outside the well, each well having spaced parallel walls between which the wheel shafts are adapted to be journaled, bearings on said walls containing bearing openings for receiving the ends of a wheel shaft, and downwardly facing openings narrower than the diameter of the shaft affording access to the bearing openings, the portions of the bearings at opposite sides of the narrower openings being free to yield relative to each other in a plane perpendicular to the shaft and to flex to and from the plane of the wall.

2. In a dolly, wheel wells open at the bottom for housing wheels provided with shafts therein, said wells enclosing the wheels so that only the lower portions thereof extend and are accessible from outside the well, each enclosure having walls between which the wheel shaft is journaled, a boss on each wall, each boss having an upper part rigid wth the wall and a lower unattached part extending downwardly from the rigid part, said unattached lower part being yieldable to and from the plane of the wall, a bearing opening in the lower part for receiving an end of a wheel shaft, and an opening in the lower part below the bearing opening narrower than the diameter of the shaft, providing access to the bearing opening, that part of the lower part at opposite sides of the narrower opening being yieldable in a plane perpendicular to the shaft to permit the shaft to be forced into and out of the bearing opening.

3. In combination with a dolly having wheel wells, bearings for removably mounting the wheels of the dolly in said wheel wells so that only the lower portions of the wheels extend and are accessible from outside the wells, each bearing comprising a pair of bosses, each boss having a circular bearing opening therein, said bosses being secured to opposite walls of the well so that said bearing openings are axially aligned, each boss also having a portion extending downwardly from said bearing opening, said portion being spaced from the wall of the well and being divided by a slot extending outwardly from the bearing opening which is narrower than the diameter of the shaft of the wheel to be mounted in the well, whereby the divisions of said portion will be flexible in directions perpendicular and parallel to the axis of said shaft.

References Cited in the file of this patent

UNITED STATES PATENTS

| | | |
|---|---|---|
| 572,778 | Stevenson | Dec. 8, 1896 |
| 1,871,809 | Lampert | Aug. 16, 1932 |
| 2,510,310 | Francis | June 6, 1950 |
| 2,552,824 | Thurman | May 15, 1951 |
| 2,775,847 | Herdklotz | Jan. 1, 1957 |

FOREIGN PATENTS

| | | |
|---|---|---|
| 614,569 | Great Britain | Dec. 17, 1948 |